US008638746B2

(12) United States Patent
Papadopoulos et al.

(10) Patent No.: US 8,638,746 B2
(45) Date of Patent: Jan. 28, 2014

(54) METHOD AND APPARATUS FOR THE JOINT DESIGN AND OPERATION OF SCHEDULING AND TRANSMISSION FOR DOWNLINK MULTI-USER MIMO WITH RECIPROCITY-BASED TRAINING

(75) Inventors: Haralabos Papadopoulos, San Jose, CA (US); Sean Ramprashad, Los Altos, CA (US); Giuseppe Caire, South Pasadena, CA (US)

(73) Assignee: NTT DoCoMo, Inc., Tokyo (JP)

( * ) Notice: Subject to any disclaimer, the term of this patent is extended or adjusted under 35 U.S.C. 154(b) by 288 days.

(21) Appl. No.: 13/288,241

(22) Filed: Nov. 3, 2011

(65) Prior Publication Data

US 2012/0113953 A1    May 10, 2012

Related U.S. Application Data

(60) Provisional application No. 61/410,212, filed on Nov. 4, 2010.

(51) Int. Cl.
*H04Q 7/00* (2006.01)

(52) U.S. Cl.
USPC ............................ 370/330; 370/328; 370/478

(58) Field of Classification Search
None
See application file for complete search history.

(56) References Cited

U.S. PATENT DOCUMENTS

| 8,271,043 B2 * | 9/2012 | Kim et al. ................... 455/562.1 |
| 2011/0249597 A1 * | 10/2011 | Papadopoulos ............... 370/280 |
| 2012/0069824 A1 * | 3/2012 | Papadopoulos et al. ...... 370/336 |
| 2012/0296591 A1 * | 11/2012 | Ohkubo et al. ................. 702/81 |

* cited by examiner

*Primary Examiner* — Duc C Ho
(74) *Attorney, Agent, or Firm* — Blakely, Sokoloff, Taylor & Zafman LLP

(57) ABSTRACT

A method and apparatus is disclosed herein for scheduling and transmission for downlink multi-user MIMO (MU-MIMO). In one embodiment, the method comprises allocating a subset of time-frequency resources in the time-frequency plane to each distinct bin class, where each bin class comprises one or more bins of user terminals across the topology, and wherein user terminals in the one or more bins of each bin class are served across the topology by the subset of time-frequency resources. The method also comprises performing joint downlink MU-MIMO transmission using a plurality of bin class-dependent wireless transmission architectures at the plurality of base stations, where one or more bin classes is associated with one of the plurality of bin class-dependent architectures, and where each of the plurality of bin class-dependent architectures use different combinations of scheduling training and MU-MIMO transmission across the topology.

27 Claims, 7 Drawing Sheets

METHOD AND APPARATUS FOR THE JOINT DESIGN AND OPERATION OF SCHEDULING AND TRANSMISSION FOR DOWNLINK MULTI-USER MIMO WITH RECIPROCITY-BASED TRAINING

PRIORITY

The present patent application claims priority to and incorporates by reference the corresponding provisional patent application Ser. No. 61/410,212, titled, "Method and Apparatus for the Joint Design and Operation of Scheduling and Pilot-Reuse for Downlink Multi-user MIMO with Reciprocity-based Training," filed on Nov. 4, 2010.

FIELD OF THE INVENTION

Embodiments of the present invention relate to the field of downlink (DL) multi-user MIMO (MU-MIMO) transmission in cellular and beyond-cellular deployments; more particularly, embodiments of the present invention relate to a class of deployments, in which user terminals are grouped into bins across the deployment and uplink training and an associated MU-MIMO transmission scheme are chosen in a group-optimized manner across the deployment.

BACKGROUND OF THE INVENTION

Downlink (DL) multi-user multiple-input multiple-output (MU-MIMO) transmission methods are well-known in the art. These DL MU-MIMO transmission methods rely on knowledge of the channel at the transmitting base station (BS), or, more precisely, the availability of estimates of the channels between the BS antennas and the user terminals (UTs) to which this BS is transmitting information. This channel state information is then used to "precode" the information intended for each of the UTs prior to transmission, in such a way, that each of the UTs is able to decode the signals of its own interest.

The necessary channel state information is obtained by transmitting pilots (i.e., known signature waveforms) over wireless medium and estimating these channels based on the received waveforms. Then these estimates are used for generating the MU-MIMO precoder (i.e., the transmission method) and for transmitting data to the UTs. Since the channels change over time (and frequency), the process of training is repeated periodically across the network. In what are referred to as "pilot-on-pilot" schemes, the pilot transmission cycles are aligned in time across all BSs, while in pilot-on-data schemes the pilot transmission cycles of a given BS overlap with data transmissions from other BSs. The fraction of time (or time-frequency slots) allocated to a single training session dictates the number of channel uses allocated for pilot training to each BS. The dimensionality of this "pilot-training" signal space places a constraint on the number of possible orthogonal (or, linearly independent) pilots that can be signaled during each training phase. Given that the number of BS-UT channels that need to be obtained across the whole network is well beyond the channel uses allocated for training in each cycle, or equivalently well beyond the number of allotted signal space dimensions for pilot training, pilots have to be reused across the network.

There are two classes of training methods used in DL MU-MIMO for obtaining channel estimates at the transmitting BS. The two classes are effectively distinguished by the parties that transmit the pilots. In what are referred to as FDD-based training schemes, to estimate the channels between the BS and each of the UTs, pilots are first transmitted by the BS. Each UT then collects measurements of the transmitted pilots and estimates its own channels. Then over a shared channel on another frequency band, the UTs communicate (feed back) these estimates to the BS in their cell.

In what are referred to as TDD-based training schemes, estimates of the channels from each UT to its transmitting BS are obtained directly at the BS, by transmitting pilots from each of the UTs. These schemes rely on the notion of "channel reciprocity," which states that the channel from a BS to a UT on a given band and at a given time instance is the same as, or more accurately, correlated to the channel from the UT to the BS on a possibly different band and at a possibly different time instance, provided the gaps in time-instances and frequency-bands of the two channels are within the channel coherence time and bandwidth, respectively. These schemes rely on sending pilots in the uplink from a set of UTs, collecting measurements at the BS, estimating the BS-UT channels based on these measurements at the BS, and then performing MU-MIMO transmission from the BS to the UTs over the same band and within the channel coherence time.

Reducing the spatial reuse factor of the pilots reduces the number of pilots that need to be signaled within each training cycle. It thus reduces the pilot overhead and allows more slots to be used for data transmission. However, the need for reusing pilots spatially in all these training schemes comes at a cost in channel estimate quality. Consider estimating a channel between a BS and a UT in its cell by means of a given pilot (from a set of orthogonal pilots). UTs throughout the network using the same pilot interfere or "contaminate" the estimates between the BS and UT of interest. Typically, the closest the interfering UT is to the BS of interest, the largest the "pilot contamination" levels. As a result, reducing the pilot spatial reuse factor can be used to either increase the fraction of time dedicated to data transmission or increase the number of simultaneously trained users. However, in both cases, it also increases the levels of pilot contamination and can thus reduce the efficiency of the data transmission cycle.

DL MU-MIMO schemes with TDD based training can often provide advantages with respect to their FDD based counterparts. In particular, assume that a fixed number of users S(t) are served in each active cell within a given scheduling slot t (whereby a scheduling slot comprises a set of time-frequency slots comprising one or more RBs). In TDD-based training schemes, increasing the number of transmit antennas per BS, while keeping S(t) fixed, does not change the training scheme and thus the training overhead. On the other hand, increasing the number of transmit antennas strictly improves the rates provided by the MU-MIMO scheme to each of the S(t) users served in each cell by the scheme. Although such increases in rate are also present in the data-transmission portion of FDD-based DL MU-MIMO, in FDD such higher-throughput transmissions from larger antenna arrays come at a cost of increased training overheads.

Subject to a limit on the number of time-frequency slots allocated for training within a scheduling slot, DL MU-MIMO schemes with reciprocity-based training can leverage the use of large antenna-arrays to provide high net cell throughput. However, if the system is not properly designed, the scheme can yield very unfair user rate distribution across the cellular deployment.

Consider the basic setting in which any given cell assigns its pilots randomly to its UTs within the cell, and independently of other cell pilot assignments. In such a setting, the uplink pilot transmitted by any one of the UTs experiences pilot contamination whose power may take values over a possibly wide range, depending on the locations (and the transmit powers) of the UTs re-using this pilot in neighboring cells. To be more specific, in DL MU-MIMO schemes with TDD-based training, the pilot contamination caused by the reuse of a pilot in a neighboring cell strongly depends on which UT has been assigned the same pilot in the neighboring cells. In particular, the quality of the estimate of the channel between a BS and a UT in its cell, obtained by a TDD-based training scheme, depends on the following quantities:

The large-scale power attenuation affecting transmissions from the UT to the BS, and the effective pilot transmit power; these dictate the power of the "useful pilot signal" component in the measured signal that is used for channel estimation at the BS of interest; and The large-scale power attenuation affecting transmissions from the UTs re-using the same pilot (in neighboring cells) to the BS of interest, and the associated transmit powers in these pilots; these dictate the power of the interference or pilot-contamination signal component in the measured signal that is used for channel estimation at the BS of interest.

The value of any such large-scale signal-strength quantity is affected by several factors, including distance between the transmitting and receiving parties, shadowing, and other environmental factors. Knowing these quantities, would allow the BS to optimally use the measurements in forming its channel estimate so as to maximize the estimate quality.

The BS may not in general possess knowledge of the interference level experienced by each of the pilots used by its UTs. In that case, it would have to be conservative in forming its estimates (i.e., it would have to assume the highest possible level or a very high level among the possible interference levels). This can result in a significant reduction of the channel estimate quality.

In order to gain some appreciation for the effects of the pilot contamination on the rates provided to UTs as a function of their location, in architectures employing MU-MIMO with reciprocity based-training, it is worth considering one well-known scheduling/training MU-MIMO scheme for DL transmission. This scheme uses very simple (random) scheduling assignments. It also uses very simple (random) training sequence assignments. The first half of the time-frequency slots within a scheduling slot are dedicated to training, and within each active cell each of the users is randomly assigned a training slot. The scheme also relies on trivial MU-MIMO precoders. In particular, during the downlink transmission (the second half of the scheduling slot), the BS linearly superimposes the signals that are intended to the scheduled users it each cell and transmits them. The signal transmitted by any given antenna to a given user in any given time-frequency slot within the scheduling slot is simply a scalar coded UT stream sample, scaled by the conjugate of channel estimate between this antenna and the UT antenna. As a result, this precoder schedules each UT on a precoding vector/beam that is the conjugate of the channel estimate between the TX antenna array and the (same) UT antenna. This precoder is commonly referred to as a linear single-user beamforming (LSUBF) precoder. The precoding vector for any given UT is selected simply as the beam that is beamforming at the UT. Note that in selecting a beam for a particular UT, this precoder makes no "multi-user" considerations or provisions, i.e., it does not take into account the interference caused by the beam to other UTs in the system.

This scheme enables high edge and center user rates by leveraging reuse-7 and enormous numbers of antennas. Although reuse-7 is highly inefficient, it is necessary in this scheme to bring edge user rates to respectable levels. To see this, consider a reuse-1 system. Because users in each cell are selected at random for transmission and pilots are reassigned in each cell randomly, it is possible that the received pilot strength at a BS from a user in its cell is lower than the aggregate received interference power, arising from all users in neighboring cells using the same pilot. As a result, the pilot contamination levels for such a user would be overwhelming, effectively resulting in zero-rate transmission to these users.

Note that, even if higher pilot reuse factors were employed in such a scheme to enable reuse-1 cellular transmission, the choice of such elementary precoder limits the net cell throughput rates. In particular, it is well known that for users in the center of a cell using precoders that also account for multi-user interference would improve performance.

As a result, there is evidently potential for improving the performance of TDD-based DL MU-MIMO schemes for cellular and beyond deployments by using UT-specific training and transmissions schemes.

SUMMARY OF THE INVENTION

A method and apparatus is disclosed herein for scheduling and transmission for downlink multi-user MIMO (MU-MIMO). In one embodiment, the method comprises allocating a subset of time-frequency resources in the time-frequency plane to each distinct bin class, where each bin class comprises one or more bins of user terminals across the topology, and wherein user terminals in the one or more bins of each bin class are served across the topology by the subset of time-frequency resources. The method also comprises performing joint downlink MU-MIMO transmission using a plurality of bin class-dependent wireless transmission architectures at the plurality of base stations, where one or more bin classes is associated with one of the plurality of bin class-dependent architectures, and where each of the plurality of bin class-dependent architectures use different combinations of scheduling training and MU-MIMO transmission across the topology.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
FIG. 1 illustrates geographic (pathloss-based) user binning according to one embodiment.

Embodiments of the present invention relate to downlink (DL) multi-user MIMO (MU-MIMO) transmission in cellular and beyond-cellular deployments. Embodiments of the invention rely on the use of a palette of architectural choices to perform the DL MU-MIMO transmission. Each architecture enables joint scheduling training and transmission across the cellular topology. In one embodiment, each architecture is characterized by its own MU-MIMO precoding scheme, operating over one or more BSs (or RAUs), its own (cell or cluster) reuse factor, and its own uplink-training scheme. In one embodiment, the training scheme in particular is self characterized by the size of the UT pilot training set, the pilot reuse factor and (rules for) the pilot reassignment method across the topology.

Embodiments of the invention leverage the use of bin classes whereby one or more bin classes are associated with each one of the DL MU-MIMO transmission architectures. The bin class concept allows efficient binning, or "pairing" across the topology of UT sets (based on geographic and/or other slowly varying nominal signal strength information) for simultaneous transmission. In this way, several bin classes are formed, and the scheduling-slot resources are split among the bin classes. Within the group of resources that are allocated to a single bin class, only users from this bin class (across the topology) are scheduled and served. The advantage of this scheme is that each bin class is independently served over its allocated resources, by an architecture that can optimized for the given bin class. By properly forming bin classes, by systematically choosing UT groups from a bin class for joint transmission, and by performing joint DL MU-MIMO transmission via a class-optimized architecture, efficient cellular and beyond-cellular schemes can be enabled with high edge and cell throughput performance.

Embodiments of the invention leverage the use of geographical information and/or slowly varying nominal received signal-strength information between user-terminals (UTs) and base stations (BSs) or remote antenna units (RAUs), to systematically and schedule groups of UTs in cells (or clusters of cells) across the deployment for simultaneous transmission. In one embodiment, simultaneous transmission involves an uplink training mechanism and an associated MU-MIMO transmission scheme that are chosen in a group-optimized manner across the deployment. The scheme thus enables the use of UT/geographic-location optimized MIMO precoders, coupled with enabling pilot assignments for uplink training.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

General Overview

Embodiments of the invention focus on methods for scheduling, training, and MU-MIMO transmission in cellular and beyond-cellular deployments with reciprocity-based training, and can enable high spectral-efficiency transmission in the downlink of these networks. Embodiments of the invention are applicable to settings involving sets of transmit (collocated or non-collocated) antennas simultaneously transmitting to UTs in their coverage area. The methods disclosed herein are also applicable to the case, where within each transmission resource block (RB), the base-station (BS) controller, controlling the joint transmission from the cluster of antennas, schedules a subset of UTs for transmission, generates multiple spatial streams (one or more for each UT), superimposes them, and simultaneously transmits them using what is commonly referred to as multi-user multiple-input multiple-output (MU-MIMO) transmission methods.

Embodiments of the invention rely on the notion of binning users across the cellular topology and separating them into bin classes, with each bin class allocated a fraction of the time-frequency resources for transmission via a bin-class specific training and MU-MIMO transmission scheme applied across the topology. Embodiments of the invention leverage the use of geographical and possibly slowly varying received signal strength information between UTs and BSs (or RAUs) to first assign each UT to a bin within a bin class. Then each bin class is served over a fraction of the available resources, without being interfered from the remaining bin class transmission. Within the scheduling slots residing in resources allocated to a single bin class, groups of UTs within the bin class are selected across the deployment and a bin-class specific training and downlink MU-MIMO precoding operation is used across the topology to simultaneously transmit to the scheduled UT set. In addition, pilot-assignments used for uplink training can be pilot-contamination optimized for the UT scheduled group. In one embodiment, this is performed as described in U.S. patent application Ser. No. 13/081,373, filed Apr. 6, 2011, "Method and Apparatus for the Joint Design and Operation of Pilot-Reuse Methods in Reciprocity-Based Training Schemes for Downlink Multi-User MIMO".

As disclosed herein, users are binned in their preferred bin/architecture class, where each bin class is associated with one of the many possible architectures, and each architecture corresponding to a unique set of a precoder, reuse factor, pilot reuse factor, and (maximum) number of users that can be served simultaneously in each cell (or cluster). In general, scheduling users within a bin-class can be performed by selecting in e.g., round-robin fashion (up to) the a priori optimized number of users, performing uplink training simultaneously for all selected users, and then scheduling all or a subset of those users (e.g., by means of a scheduling criterion).

In one embodiment, the wireless communication system for wireless communication information with user terminals includes multiple base stations located in cells in a topology and a base station controller. The base station controller controls joint transmission of the plurality of base stations by allocating a subset of time-frequency resources in a time-frequency plane to each distinct bin class, where each bin class includes one or more bins of user terminals across the topology, and the user terminals in the one or more bins of each bin class are served across the topology by the subset of time-frequency resources. The base stations perform joint downlink MU-MIMO transmission using multiple bin class-dependent wireless transmission architectures at the base stations, where one or more bin classes is associated with one of the bin class-dependent architectures, and wherein each bin class-dependent architecture uses a different combination of scheduling and MU-MIMO transmission across the topology for that bin class.

In the following, a sample set of embodiments are described as well as their potential benefits. Embodiments are illustrated in the context of the one-dimensional (1D) linear topology of BSs such as shown, for example, in FIG. 1. However, one skilled in the art would recognize that embodiments of the present invention are applicable to all topologies and are not limited to 1D linear topologies.

FIG. 1 illustrates geographic (pathloss-based) user binning according to one embodiment. Referring to FIG. 1, the b-th cell spans $[b-\frac{1}{2}, b+\frac{1}{2}]$ and BS b is located at b. For illustration purposes, the focus is on a "pathloss with fast fading" channel model, whereby the nominal received signal strength between a TX antenna (either at a BS or at a remote antenna unit (RAU)) and a UT antenna equals the pathloss between the two antennas, and this pathloss value is only a function of the distance between the two antennas. In this case, embodiments of the invention can be viewed as geographical-location optimized scheduling/training and transmission.

In one embodiment, each cell is split into 2K bins (each of size e.g., $\frac{1}{2}K$) for some K>1. Let (k,c) for k=1, 2, . . . , 2K, denote the k-th bin in cell c (enumerated from left to right, as (1,c) (2,c), . . . , (2K,c)), as shown in FIG. 1. Bin class k is formed by all the bins (k,c) for all c, and users in (cell) bin class k across the topology are jointly served over a subset of time-frequency slots, such as shown, for example, in FIG. 2.

Figure 2:
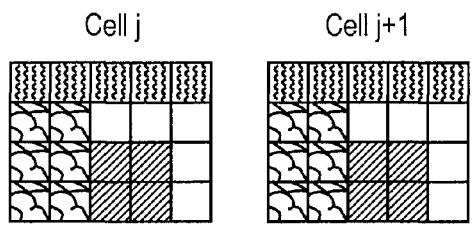
FIG. 2 illustrates the time-frequency plane is split into groups, each group serving a distinct bin class, according to one embodiment.

Referring to FIG. 2, the time-frequency (TF) plane is split into groups of slots, and each group is used across the topology to serve users in a particular (distinct) bin class. In particular, within any scheduling slot serving a particular bin class, users from bins in the bin class are chosen for simultaneous uplink training and DL MU-MIMO transmission. That is, within the group of time-frequency slots serving a given bin class, only users residing in bins associated with the given bin class are served across the topology. In the illustrations provided herein, it is assumed for simplicity that a fixed number of time-frequency slots, $L_T$, are allocated for training within each scheduling slot, although in practice this may also be an optimization variable.

In one embodiment, users are split into bins, and bins across the topology are used to form bin classes. Each bin class (i.e., UTs falling in bins within a bin class) is given a fraction of the available time-frequency resources and an architecture is chosen (e.g., a priori) for serving the bin class over this fraction of the time-frequency resources. In one embodiment, the allocation of the available time-frequency resources is performed by a base station controller (e.g., the base station controllers of FIGS. 1, and 3-11) that is communicably coupled with the base stations. In an alternative embodiment, an allocation unit, separate from the base station controller, controls the allocation. In one embodiment, the controller specifies the mapping of time-frequency slots to bin-classes getting served. In one embodiment, for each bin-class, the controller also specifies the architecture to be used (including the number of users served, the precoder, the pilot sequences, and all these can in principle be base-station specific). Also within the set of time-frequency slots that are allocated to a bin class, with frequency reuse, the controller may specify the subset of slots during which the BS is transmitting. Similarly, in one embodiment in the cluster transmission case, the controller also specifies the mapping between subsets of slots and BS clusters.

In one embodiment, the architecture is chosen from, e.g., a palette of available architecture choices. In one embodiment, the palette or architectures comprise cellular and cluster architectures that can be represented by a triplet (F, C, Z) and a pilot-reuse factor Q, whereby C represents the number of BSs engaging a cooperative transmission (C=1 corresponds to cellular, while C>1 corresponds to cluster transmission);

F represents the architecture (cellular or cluster) reuse-factor; and

Z represents the number of (closest) BSs from which any given UT experiences no interference.

In one embodiment, the palette only includes cellular architectures (C=1), and 2K bin classes are defined, whereby the k-th bin class is defined as the bins in the set $X_k=\{(k,c); \text{for all } c\}$. Consequently, a palette of cellular architectures is considered as a choice for serving all UTs falling within one of the bins in the set $X_k=\{(k,c); \text{for all } c\}$. In one embodiment, any given cellular architecture is characterized by: its reuse factor, F; its pilot reuse factor, Q, together with a method for geographically reassigning pilots across the deployment; and its own MU-MIMO precoder.

Figure 3:
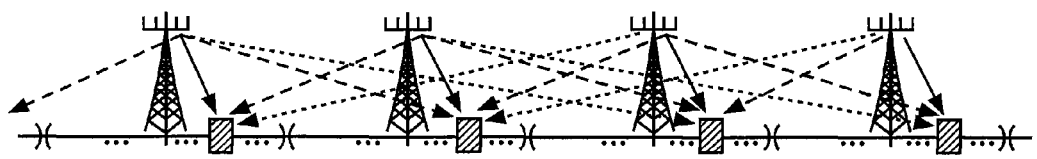
FIG. 3 illustrates an example showing cellular transmission within a band serving a particular bin class according to one embodiment.

FIG. 3 illustrates an example showing cellular transmission within a band serving a particular bin class. Referring to FIG. 3, within each cell, S users from the bin (belonging to the bin class that is being served on this scheduling slot) are scheduled. Reciprocity-based training is performed, followed by DL MU-MIMO cellular transmission. Note that the dashed lines represent intercell interference, while the solid lines represent transmissions containing useful signals for the users in the bin.

Figure 4:
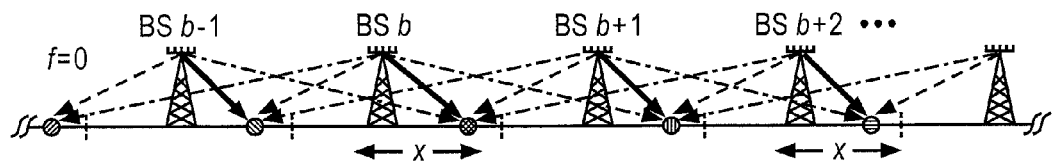
FIG. 4 illustrates a (1,1,0) scheme, corresponding to reuse-1 cellular Linear Single-User Beamforming (LSUBF) according to one embodiment.
Figure 5:
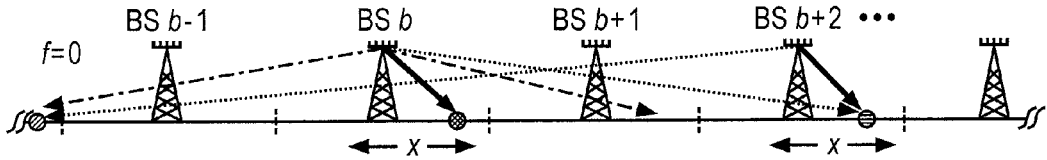
FIG. 5 illustrates a (2,1,0) scheme, corresponding to reuse-2 cellular LSUBF according to one embodiment.
Figure 5:
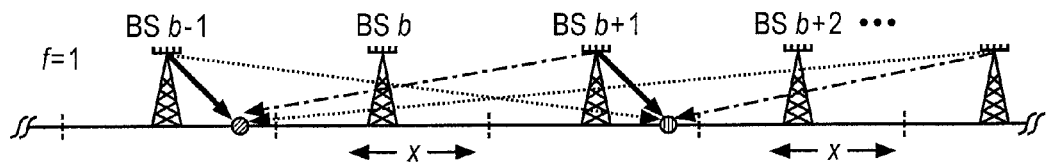
Figure 6:
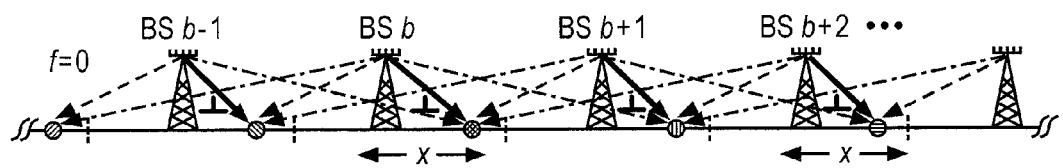
FIG. 6 illustrates a (1,1,1) scheme, corresponding to reuse-1 cellular Linear Zero-Forcing Beamforming (LZFBF) according to one embodiment.
Figure 7:
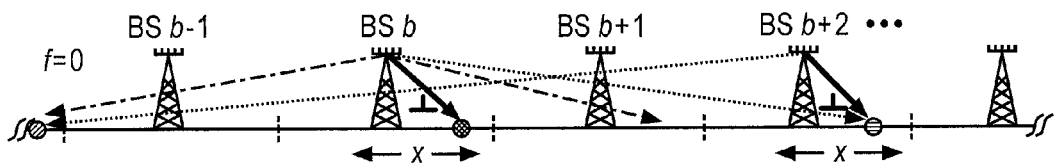
FIG. 7 illustrates a (2,1,1) scheme, corresponding to reuse-2 cellular LZFBF according to one embodiment.
Figure 7:
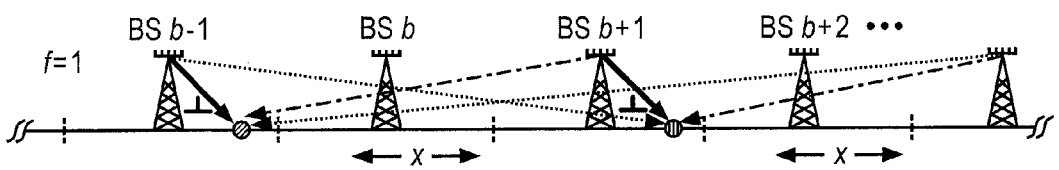
Figure 8:
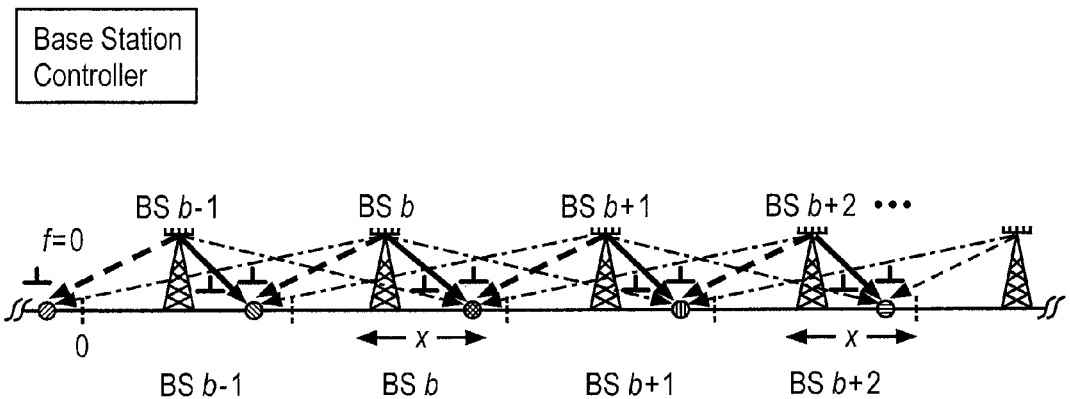
FIG. 8 illustrates a (1,1,2) scheme, corresponding to reuse-1 cellular LZFBF with nearest-cell interference nulling according to one embodiment.

FIGS. 4-8 depict several such cellular (F, 1, Z)-type architectures according to different embodiments of the present invention. FIGS. 4, 6, and 8, in particular, depict reuse-1 architectures (i.e., F=1), whose precoders vary with respect to zero-forcing constraints that they are required to satisfy. FIGS. 5 and 7 correspond to reuse-2 versions of the architectures in FIGS. 4 and 6, respectively. Note that in all the figures, the bin class is implicitly identified by a variable "x", which denotes the distance between the center of a cell bin and the cell BS (or equivalently the center of the cell).

FIG. 4 illustrates a (1,1,0) scheme, corresponding to reuse-1 cellular Linear Single-User Beamforming (LSUBF) according to one embodiment. Referring to FIG. 4, within each cell, S users in the bin (belonging the bin class being served) are chosen for training and transmission. After uplink training, base station b simultaneously transmits data streams to the S scheduled users with a LSUBF precoder.

FIG. 5 illustrates a (2,1,0) scheme, corresponding to reuse-2 cellular LSUBF according to one embodiment. Referring to FIG. 5, within each of the two bands serving the bin class, half of the cells are active (either the odd or the even ones). For each active cell b in a band, in each scheduling slot, S users in the bin (belonging to the bin class being served) are chosen for training and transmission. After uplink training, base station b simultaneously transmits data streams to the S scheduled users with a LSUBF.

Note that in one embodiment the number of users, S, that the precoder of a given (F, 1, Z) scheme can serve in each cell is a parameter that can range between 1 and $S_{max}$, and can be optimized independently for each bin class, i.e., for each set $X_k$. The maximum number of users, $S_{max}$, that can be scheduled in any given cell simultaneously is given by $S_{max} \leq \text{floor}(L_T/Q)$, where floor(x) denotes the largest integer not exceeding x. Note, however, that $S_{max}$ depends indirectly on the specific precoder CSI requirements. For instance, to operate a LZFBF in a given active cell (e.g., in FIG. 6) requires the CSI between each of the S scheduled UTs in the cell and the cell BS. For cell-center users (e.g., users in bin classes $X_K$, $X_{K+1}$), a pilot reuse factor of Q=1 may suffice, regardless of the reuse factor, F, yielding for LZFBF the condition $S \leq S_{max} = \max\{L_T, M\}$, with M denoting the number of BS antennas. Of course, any $Q \geq 1$ may be used for serving $X_K$ and $X_{K+1}$, yielding $S \leq S_{max} = \max\{\text{floor}(L_T/Q), M\}$. A training scheme with Q=2 for instance yields better CSI than the system with Q=1. However, it may also restrict the maximum number of simultaneously scheduled users and thereby the provided multiplexing gains. Which Q value is preferred depends on the architecture being considered, the bin class, and the specific M and $L_T$ values. As one example, consider a center user with a reuse-1 architecture using LZFBF (i.e., the architecture in FIG. 6). If M is small enough with respect to $L_T$, i.e., if, $M \leq L_T/2$, then $S_{max}=M$ for both Q=1, and Q=2, pilot-reuse. Given an optimal number of users S for Q=1 pilot reuse, the Q=2 system can also schedule the same number of users, S, and would yield higher performance with S users, due to its superior channel estimates. As a result, Q=2 would be preferred in place of Q=1. At the other extreme, however, where $M > L_T$, the Q=1 scheme could schedule up to twice as many users than a Q=2 scheme. In such cases, using Q=1 is usually a better choice in terms of maximizing the bin rates.

Embodiments of the invention allow the use of different reuse factors in serving different bin classes. For example, consider serving users with LZFBF, with either of the architectures in FIGS. 6 and 7. FIG. 6 illustrates a (1,1,1) scheme, corresponding to reuse-1 cellular Linear Zero-Forcing Beamforming (LZFBF) according to one embodiment. Referring to FIG. 6, within each cell, S users in the bin (belonging to the bin class being served) are chosen for training and transmission. After uplink training, base station b simultaneously transmits data streams to the S scheduled users, with a LZFBF precoder. Note that, due to the zero-forcing conditions enforced by the LZFBF precoders, each served UT in a bin does not experience interference from the signals transmitted by the serving base station that are intended for other UTs.

FIG. 7 illustrates a (2,1,1) scheme, corresponding to reuse-2 cellular LZFBF according to one embodiment. Referring to FIG. 7, within each of the two bands serving the bin class, half of the cells are active (either the odd or the even ones). For each active cell b in a band, and in any given scheduling slot, S users in the bin (belonging to the bin class being served) are chosen for training and transmission. After uplink training, base station b simultaneously transmits data streams to the S scheduled users, with a LZFBF precoder. Due to zero forcing, each served user in a bin does not experience interference from signals transmitted to other UTs by the serving base station.

Thus, with respect to serving users with LZFBF in FIGS. 6 and 7, for edge users, e.g., users in bin classes $X_1$, $X_{2K}$, the reuse-1 architecture yields low SINRs, and thereby low per-user rates. This is true even with high pilot reuse due to the high levels of interference from neighboring transmitting stations. Although the reuse-2 architecture in FIG. 7 incurs a factor-of-two loss in multiplexing gain (as it serves only every other bin in the class on each band), the fact that transmissions are turned off from cells that are neighboring each active cell means significantly improved edge-user SINRs with respect to the reuse-1 case. For center users, on the other hand, the reuse-1 architecture in FIG. 6 is preferable, since the improvement in SINR offered by the reuse-2 architecture in FIG. 7 is outweighed by the loss in multiplexing gains due to the reuse-2 factor.

In one embodiment, only reuse-1 and reuse-2 LZFBF architectures are considered as choices for serving all the users in the topology. Transmission resources are split into 2K parts, with the k-th part used to serve bin class k. Bin class k, for each value of k in {K−m+1, ..., K, K+1, ..., K+m} for some m is served with a reuse-1 LZFBF architecture, i.e., (1,1,1), while the rest of the bin classes are served with a reuse-2 LZFBF architecture, i.e., (2,1,1). In one embodiment, the number of users scheduled by each architecture and the pilot reuse scheme is optimized (with off line optimization) for each bin class. Pilots can be reassigned randomly per active cell or techniques can be employed such as those described in U.S. patent application Ser. No. 13/081,373, filed Apr. 6, 2011, "Method and Apparatus for the Joint Design and Operation of Pilot-Reuse Methods in Reciprocity-Based Training Schemes for Downlink Multi-User MIMO".

FIG. 8 illustrates a (1,1,2) scheme, corresponding to reuse-1 cellular LZFBF with nearest-cell interference nulling according to one embodiment. Referring to FIG. 8, within each cell, S users in the bin (belonging to the bin class being served) are chosen for training and transmission. After uplink training, base station b simultaneously transmits data streams to the S scheduled users, with a LZFBF precoder subject to also interference constraints to the nearest next-cell served users. Due to zero forcing, each served user in a bin does not experience interference from the signals transmitted to other UTs from the two closest base stations.

Figure 9:
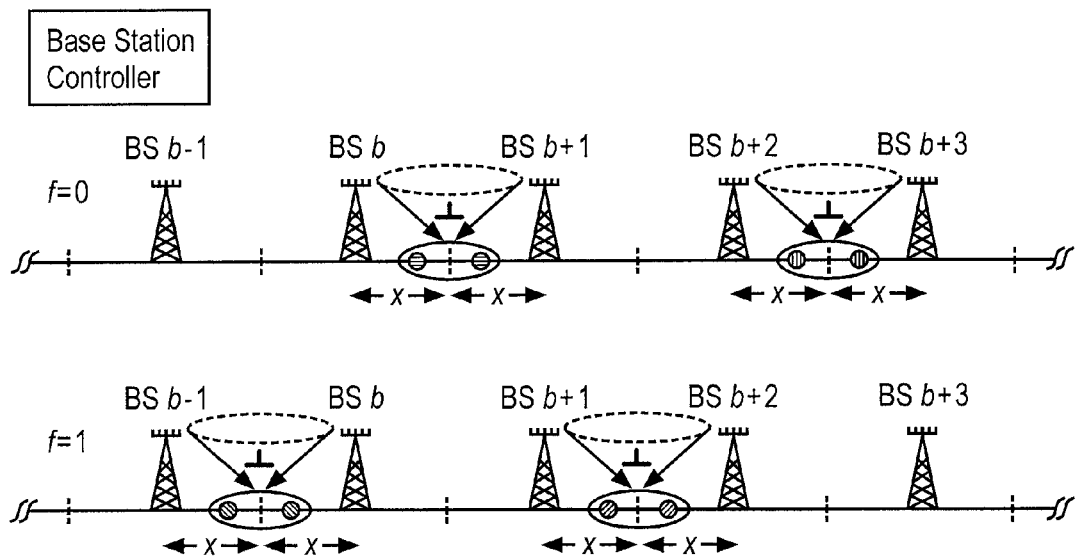
FIG. 9 illustrates a (2,2,2) scheme, corresponding to reuse-2 (2-cell) cluster LZFBF according to one embodiment.
Figure 10:
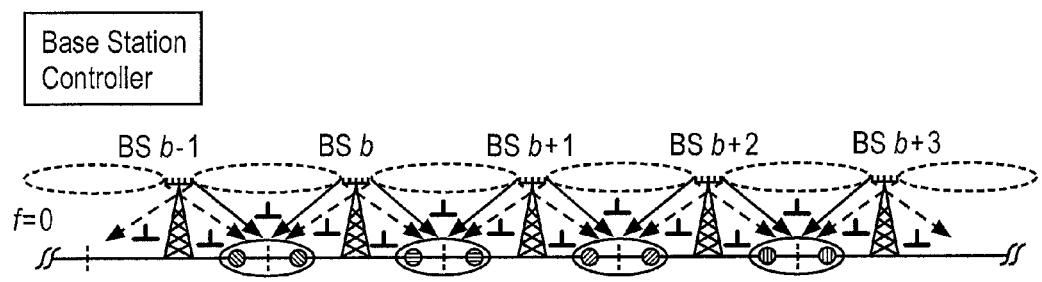
FIG. 10 illustrates a (1,2,2) scheme, corresponding to reuse-1 cluster LZFBF transmission with interference nulling to transmissions from the closest two BSs according to one embodiment.

The binning classes may also take other forms. FIGS. 9 and 10 show two cluster architectures serving "bin clusters" in unison across the topology. In these cases, the bin classes correspond to collections of clusters of bins. In particular, denoting by cluster b the cluster of BSs comprised of BSs b and b+1, the bin classes comprise all cluster bins formed by pairs of bins of the form [k,b]={(2K−k+1,b),(k,b+1)} for k=1, ..., K. The k-th (cluster) bin class corresponds to the collection of all cluster bins of the form [k,b]. Similarly to the cellular case, in FIGS. 9 and 10, the bin class being served is implicitly identified by the variable "x", which denotes the distance between the center of the left cell bin in the cluster bin and the left cell BS (or equivalently the center of the left cell). Unlike, the cellular case, however, where $½<x<½$, in the cluster case $0≤x<½$. FIGS. 9 and 10 also imply an additional set of potential constraints in selecting UTs and assigning pilots in these cluster cases.

FIG. 9 illustrates a (2,2,2) scheme, corresponding to reuse-2 (2-cell) cluster LZFBF according to one embodiment. Referring to FIG. 9, users are served by clusters of BSs, whereby cluster b comprises BSs b and b+1. Within each of the two bands serving the bin class, half of the clusters are active (either the odd or the even ones). That is, when bin class "x" is served, $S=S(x)$ users are selected from each active cluster. Within each cluster b that is active in a band, S users from the b-th "cluster bin" (belonging to the class been served) are chosen for training and transmission. In particular, S users are chosen, evenly split between the cell bins in the cells b and b+1, comprising the cluster bin. Furthermore, regarding uplink training, any given pilot sequence may be assigned to UTs in only left-cell bins or only right-cell bins in active clusters, or it may be alternated between left- and right-cell UTs every time it is reassigned. After uplink training, cluster b simultaneously transmits data streams to the S scheduled users in the cluster, with a LZFBF precoder. Due to zero forcing, each served user does not experience interference from the signals transmitted to other UTs by its closest two (i.e., its serving) BSs.

FIG. 10 illustrates a (1,2,2) scheme, corresponding to reuse-1 cluster LZFBF transmission with interference nulling to transmissions from the closest two BSs according to one embodiment. Referring to FIG. 10, within each cluster, S users in the cluster bin (evenly split between the two cells) of the bin class being served are chosen for training and transmission. As with the embodiment of FIG. 9, regarding uplink training, any given pilot sequence may be assigned to UTs in only left-cell bins or only right-cell bins in active clusters, or it may be alternated between left- and right-cell UTs every time it is reassigned. In one embodiment, the UTs chosen from the left and from the right bin may be predetermined to be e.g., the same (or about the same). After uplink training, cluster b simultaneously transmits data streams to the S scheduled users in the cluster, with a LZFBF precoder. In order to guarantee that each served user experiences no interference from signals transmitted by its serving cluster of BSs, each precoder is designed subject to additional ZF constraints to BS-UT channels of the scheduled UTs in the neighboring cells.

In one embodiment, considering a palette of cellular and cluster architectures, bins may be split into "cell bin classes" and "cluster bin classes". Cell bin classes, comprise cell bins only, while cluster bin classes are comprised of only cluster bins. In one embodiment, UTs in each cell bin class are served with a (possibly bin-class specific) cellular architecture, while UTs in each cluster bin class are served with a (possibly bin-class specific) cluster architecture.

Figure 11:
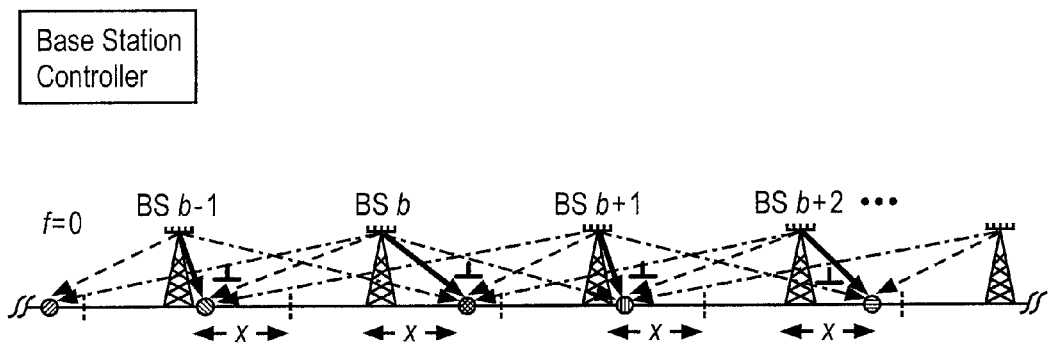
FIG. 11 illustrates cellular "FFR-type" scheme with LZFBF transmission according to one embodiment.

Another embodiment involves the use of cellular fractional frequency reuse (FFR) type schemes. FIG. 11 shows one of the simplest cellular FFR-type schemes, which is based on cellular LZFBF. In this case bin classes are formed by pairing bin (k,b) with bin (K+k,b+1) in the neighboring as shown in FIG. 11. FIG. 11 illustrates a cellular "FFR-type" scheme with LZFBF transmission according to one embodiment. Referring to FIG. 11, "FFR-type" bin classes are formed by pairing bin "x" in odd cells with bin "sign(x) (½−x)" in even cells. In one embodiment, two distinct LZFBF precoders are used across the topology, one for odd cells and one for even cells. In particular, when the odd (even) cells serve bins of UTs that are closer to their cell-edge than the bins of UTs served by the even (odd) cells, the odd (even) cells use higher transmit power than nominal, while the even (odd) cells transmit at a lower power than nominal. As a result, viable SINR levels are available to edge UTs (even with a reuse-1 architecture), at the expense of cell-center UT SINRs and rates. For any given bin class, the number of users simultaneously scheduled and served in each odd cell may be different than the number served in even cells. In particular these parameters (as well as the transmit powers of odd and even cells) can be optimized offline on a per bin-class basis and can thus be optimally set over the time-frequency resources allocated to different bin classes.

Many immediate extensions exist. For example, cellular cluster and FFR-type architectures can be all jointly considered. In one embodiment, users are placed in bins and these bins are split into "cell" "cluster" and "FFR-type" bin classes. In such a case, each bin class is allocated a fraction of the scheduling resources, and is operated independently of all the other bin classes as described above. In one embodiment, UTs in cell, cluster, and FFR-type bin classes are served with cellular, cluster, and FFR-type architectures that are bin-class optimized.

In one embodiment, one or more bin classes are included that as served by a cellular architecture, but in each active cell, users are chosen from a set of bins in the cell. In one embodiment, in an active cell b, $S_1$ users are chosen from bin $(k_1,b)$, and $S_2$ users are chosen from bin $(k_2,b)$. The cellular MU-MIMO precoder is applied such that each chosen UT in $(k_1,b)$ sees no interference from the $Z_1$ closest BSs, while each chosen UT in $(k_2,b)$ sees no interference from the $Z_2$ closest BSs, and $Z_1$ may be the same or different from $Z_2$.

In one embodiment, additional nominal received signal-strength information is used to classify users into bins. Consider for instance relying on serving the user population with reuse-F cellular LZFBF schemes. In one embodiment, the information used for classifying users into bins may also include: the nominal received signal strength at the UT with respect to its transmitting BS; and the UT's received signal strength with respect to one or more neighboring interfered BSs.

In one embodiment, this is accomplished by having each BS infrequently estimate (or update its estimate) of the large-scale nominal received signal strength at each UT that is "sufficiently close" (by downlink training, or as a byproduct of the uplink training cycle). Such updates may be in the order of several seconds or minutes. Users in a bin don't all have the same SINRs on a given architecture, but rather SINRs within a range. In one embodiment, only when the user's channel changes sufficiently to warrant changing its bin class, these updates happen. Any time there is such an update, only a small fraction of users is expected to change their bin class. The term "sufficiently close" is used here to encompass UTs that the BS serves as well as all UTs in neighboring BSs to which the nominal received signal strength is non-negligible. In one embodiment, for each UT in a neighboring cell for which a BS has obtained such a received signal strength estimate, the BS makes this estimate available to the BS serving this UT. In turn, then each BS has enough information on the received signal-strength levels between each of its own UTs and neighboring BSs that allows it to form nominal SINR estimates for each of its UTs in the context of each of the architectures. The UT's nominal SINR estimate over each of the architectures then can be readily "mapped" to an equivalent "virtual" bin location in the associated geography-based scheme (e.g., FIGS. 6 and 7, for F=1, and F=2, respectively). Consequently, rates provided to the UT under all architectures can be readily compared. The architecture yielding the highest rate to the UT can then be chosen and the UT can then be placed in the appropriate ("virtual") bin class. Finally, the pilot reuse and assignments across the scheduled UT population can be chosen. In one embodiment, this can be done using the techniques described in U.S. patent application Ser. No. 13/081,373, filed Apr. 6, 2011, "Method and Apparatus for the Joint Design and Operation of Pilot-Reuse Methods in Reciprocity-Based Training Schemes for Downlink Multi-User MIMO".

Although all the examples described in this invention consider uniform linear topologies and UT distributions, it should be evident that the proposed techniques can be readily applied to 2D topologies with uniform or non-uniform BS distributions, uniform static or randomly changing UT cell distributions, as well as other state-of-the-art MU-MIMO precoding methods, not considered in the examples.

An Example of a Process for Downlink Transmission

Figure 12:
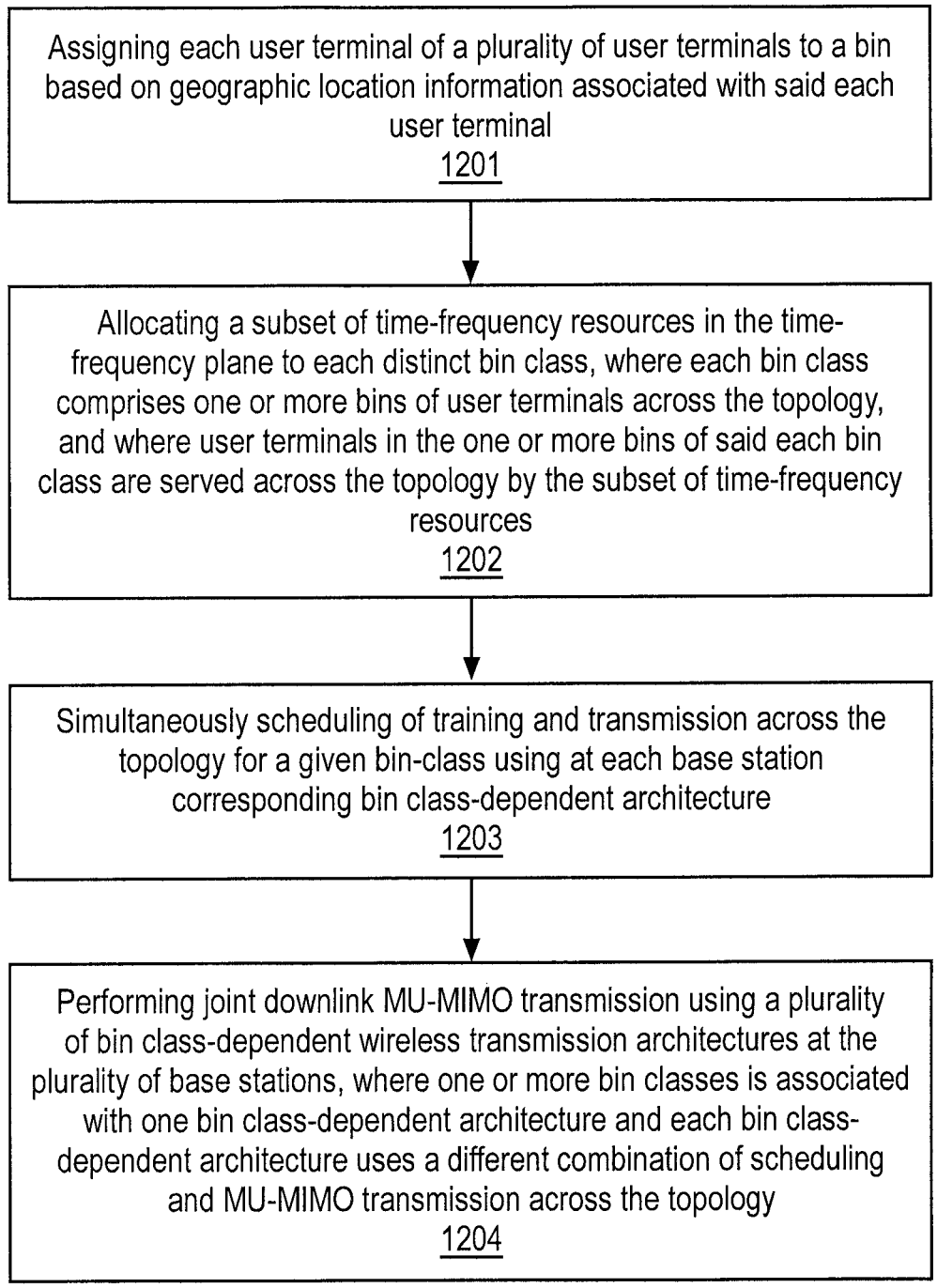
FIG. 12 is a flow diagram of one embodiment of a process for communicating in the downlink of a wireless communication network having a topology of cells.

FIG. 12 is a flow diagram of one embodiment of a process for communicating in the downlink of a wireless communication network having a topology of cells. The process is performed by processing logic that may comprise hardware (circuitry, dedicated logic, etc.), software (such as is run on a general purpose computer system or a dedicated machine), or a combination of both.

Referring to FIG. 12, the process begins by processing logic assigning each user terminal of a plurality of user terminals to a bin based on geographic location information associated with said each user terminal (processing block 1201). In one embodiment, assigning each user terminal to a bin is also based on large-scale channel state information corresponding to a channel between each user terminal and a subset of neighboring base-stations. In one embodiment, the bins are split into cell bin classes comprising only cell bins with user terminals only served with a cellular architecture or cluster bin classes that only contain cluster bins with user terminals only served with a cluster architecture.

Processing logic in a base station controller or other control entity allocates a subset of time-frequency resources in the time-frequency plane to each distinct bin class, where each bin class comprises one or more bins of user terminals across the topology, and wherein user terminals in the one or more bins of said each bin class are served across the topology by the subset of time-frequency resources (processing block 1202). In one embodiment, each subset serves its distinct bin class in one or more scheduling slots across the topology.

Subsequently, processing logic performs simultaneously scheduling of training and transmission across the topology for a given bin-class using at each base station corresponding bin class-dependent architecture (processing block 1203), including selecting user terminal groups of a bin class for joint transmission, wherein user terminals of one or more bins of the bin class are jointly served across the topology over a scheduling slot. In one embodiment, the scheduling is performed by each of the base stations. In one embodiment, selecting user terminals of a bin class for transmission includes selecting, within each cell, a subset of user terminals in each bin in the bin-class for scheduling. In another embodiment, selecting user terminals of a bin class for transmission includes selecting, within each cluster of base stations, a subset of user terminals in each bin in the bin-class for scheduling.

After scheduling, processing logic in the base stations performs joint downlink MU-MIMO transmission using a plurality of bin class-dependent wireless transmission architectures at the plurality of base stations, wherein one or more bin classes is associated with one of the plurality of bin class-dependent architectures, and wherein each of the plurality of bin class-dependent architectures use different combinations of scheduling training and MU-MIMO transmission across the topology (processing block 1204). Thus, in this way, scheduling training and transmission are performed in a manner specific to each bin class.

In one embodiment, the plurality of bin class-dependent wireless transmission architectures employs one or more MU-MIMO wireless transmission features that are different from each other. In one embodiment, at least two architectures of the plurality of bin class-dependent wireless transmission architectures use different pre-coders for transmission. In another embodiment, at least two architectures of the plurality of bin class-dependent wireless transmission architectures serve a different maximum number of users per scheduling slot. In yet another embodiment, at least two architectures of the plurality of bin class-dependent wireless transmission architectures use different reuse factors. In yet a further embodiment, at least two architectures of the plurality of bin class-dependent wireless transmission architectures use different pilot reuse factors.

In one embodiment, the features of each of the plurality of bin class-dependent wireless transmission architectures include reuse factor, pilot-reuse factor, and MU-MIMO pre-coder. In one embodiment, the features of each of the plurality of bin class-dependent wireless transmission architectures further include: a number of base stations engaging in cooperative transmission to transmit to users in a given bin within a bin class and a number of base stations from which it is required that their precoded transmissions cause no interference (are zero-forced) to any scheduled given user terminal in the bin.

Figure 13:
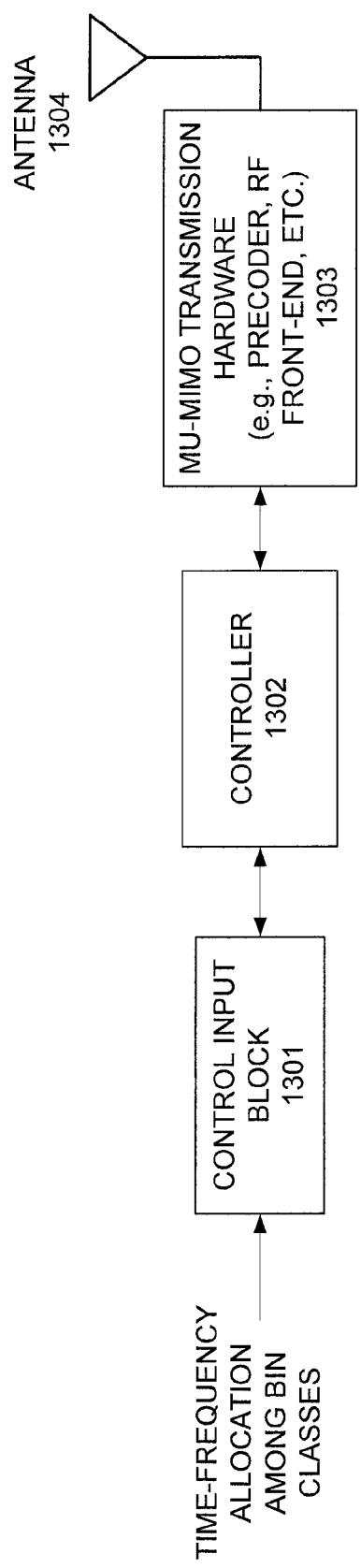
FIG. 13 is a block diagram of a base station.

FIG. 13 is a block diagram of one embodiment of a base station. Referring to FIG. 13, controller input block 1301 receives, as inputs from a base station controller, a description of how the time-frequency plane is allocated among all the bin classes. In one embodiment, the input also describes how the time-frequency resources assigned to a given class are partitioned into scheduling slots, and, within each scheduling slot, into training and transmission. In one embodiment, input 1310 also specifies some elements of the architecture to use (e.g., number of users to schedule simultaneously in a bin class, transmit power to be used, etc). Controller input block 1301 is coupled to controller 1302, which controls the transmission.

Controller 1302 receives inputs from block 1301 that identifies scheduling slots, and within each scheduling slot, it identifies the bin class. Controller 1302 selects a subset of users (based on bin-class dependent architecture and possibly input from block 1301), provides each scheduled user terminal an index indicating which pilot to use (using MU-MIMO transmission hardware 1303), and, once uplink training (using MU-MIMO transmission hardware 1303) is through, estimates the channels and uses them to design the precoder (specific to the bin class). Thereafter, controller 1302 uses them for MU-MIMO transmission in conjunction with MU-MIMO transmission hardware 1303 and antenna 1304.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for scheduling training and transmission in the downlink of a wireless communication network having a topology of cells, the method comprising:
    allocating a subset of time-frequency resources in the time-frequency plane to each distinct bin class, each bin class comprising one or more bins of user terminals across the topology, and wherein user terminals in the one or more bins of said each bin class are served across the topology by the subset of time-frequency resources; and
    performing joint downlink MU-MIMO transmission using a plurality of bin class-dependent wireless transmission architectures at the plurality of base stations, wherein one or more bin classes is associated with one of the plurality of bin class-dependent architectures, and wherein each of the plurality of bin class-dependent architectures uses different combinations of scheduling training and MU-MIMO transmission across the topology.

2. The method defined in claim 1 wherein each subset of time-frequency resources serves its distinct bin class in one or more scheduling slots across the topology.

3. The method defined in claim 1 further comprising selecting user terminal groups of a bin class for joint transmission, wherein user terminals of one or more bins of the bin class are jointly served across the topology over a scheduling slot.

4. The method defined in claim 1 further comprising assigning each user terminal of a plurality of user terminals to a bin based on geographic location information associated with said each user terminal.

5. The method defined in claim 1 further comprising assigning each user terminal of a plurality of user terminals to a bin based on large-scale channel state information corresponding to a channel between said each user terminal and a subset of neighboring base-stations.

6. The method defined in claim 1 further comprising simultaneously scheduling training and transmission across the topology for a given bin-class using its corresponding bin class-dependent architecture.

7. The method defined in claim 6 further comprising selecting a subset of user terminals in each bin in the bin-class for scheduling.

8. The method defined in claim 7 wherein selecting the subset of user terminals occurs within each cell.

9. The method defined in claim 7 wherein selecting the subset of user terminals occurs within each cluster of base stations.

10. The method defined in claim 1 further comprising scheduling training and transmission according to bin class.

11. The method defined in claim 1 wherein the bins are split into cell bin classes comprising only cell bins with user terminals only served with a cellular architecture or cluster bin classes that only contain cluster bins with user terminals only served with a cluster architecture.

12. The method defined in claim 1 wherein the plurality of bin class-dependent wireless transmission architectures employs one or more MU-MIMO wireless transmission features that are different from each other.

13. The method defined in claim 12 wherein at least two architectures of the plurality of bin class-dependent wireless transmission architectures use different pre-coders for transmission, serve a different maximum number of users per scheduling slot, use different reuse factors, or use different pilot reuse factors.

14. The method defined in claim 12 wherein the features of each of the plurality of bin class-dependent wireless transmission architectures include reuse factor, pilot-reuse factor, and MU-MIMO precoder.

15. The method defined in claim 14 wherein the features of each of the plurality of bin class-dependent wireless transmission architectures further include: a number of base stations engaging in cooperative transmission and a number of base stations which a given user terminal experiences no interference.

16. A wireless communication system for wireless communication information with a plurality of user terminals, the system comprising:
    a plurality of base stations located in cells in a topology;
    a base station controller to control joint transmission of the plurality of base stations by allocating a subset of time-frequency resources in a time-frequency plane to each distinct bin class, each bin class comprising one or more bins of user terminals across the topology, and wherein user terminals in the one or more bins of said each bin class are served across the topology by the subset of time-frequency resources; and
    wherein the plurality of base stations perform joint downlink MU-MIMO transmission using a plurality of bin class-dependent wireless transmission architectures at the plurality of base stations, wherein one or more bin classes is associated with one of the plurality of bin class-dependent architectures, and wherein each of the plurality of bin class-dependent architectures uses different combinations of scheduling training and MU-MIMO transmission across the topology.

17. The system defined in claim 16 wherein each subset of time-frequency resources serves its distinct bin class in one or more scheduling slots across the topology.

18. The system defined in claim 16 wherein base stations of the plurality of base stations select user terminal groups of a bin class for joint transmission, wherein user terminals of one or more bins of the bin class are jointly served across the topology over a scheduling slot.

19. The system defined in claim 16 wherein base stations of the plurality of base stations assign each user terminal of a plurality of user terminals to a bin based on geographic location information associated with said each user terminal.

20. The system defined in claim 16 wherein base stations of the plurality of base stations assign each user terminal of a plurality of user terminals to a bin based on large-scale channel state information corresponding to a channel between said each user terminal and a subset of neighboring base-stations.

21. The system defined in claim 16 wherein base stations of the plurality of base stations simultaneously schedule training and transmission across the topology for a given bin-class using its corresponding bin class-dependent architecture.

22. The system defined in claim 16 wherein base stations of the plurality of base stations select, within each cell, a subset of user terminals in each bin in the bin-class for scheduling.

23. The system defined in claim 16 wherein base stations of the plurality of base stations select, within each cluster, a subset of user terminals in each bin in the bin-class.

24. The system defined in claim 16 wherein the plurality of bin class-dependent wireless transmission architectures employs one or more MU-MIMO wireless transmission features that are different from each other.

25. The system defined in claim 24 wherein at least two architectures of the plurality of bin class-dependent wireless transmission architectures use different pre-coders for transmission, serve a different maximum number of users per scheduling slot, use different reuse factors, or use different pilot reuse factors.

26. The system defined in claim 24 wherein the features of each of the plurality of bin class-dependent wireless transmission architectures include reuse factor, pilot-reuse factor, and MU-MIMO precoder.

27. The system defined in claim 26 wherein the features of each of the plurality of bin class-dependent wireless transmission architectures further include: a number of base stations engaging in cooperative transmission and a number of base stations which a given user terminal experiences no interference.

* * * * *